Dec. 29, 1925.
H. SCHMARGE
VALVE CONSTRUCTION FOR AIR BRAKE SYSTEMS
Filed May 25, 1925
1,567,394
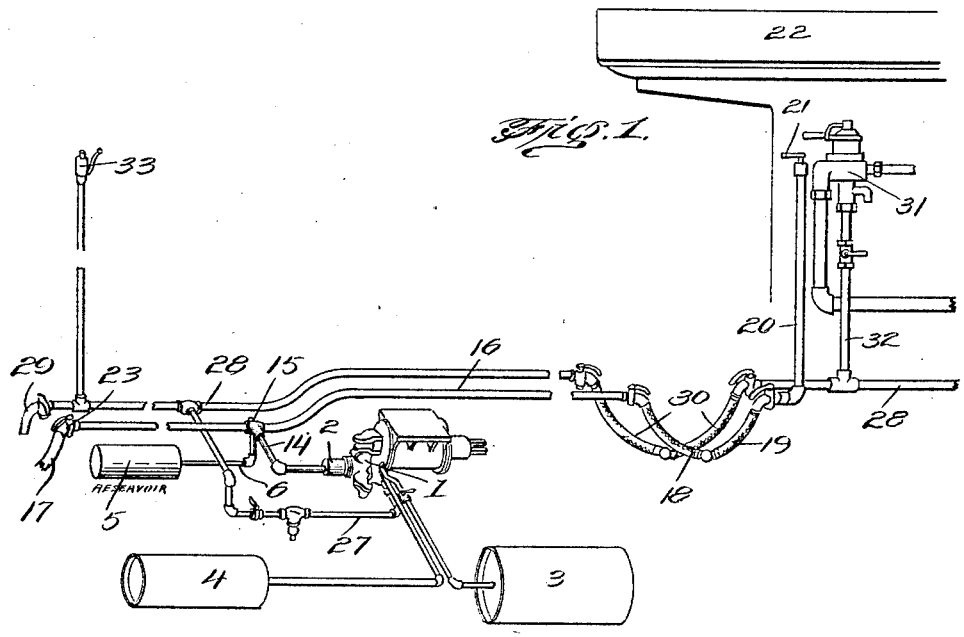
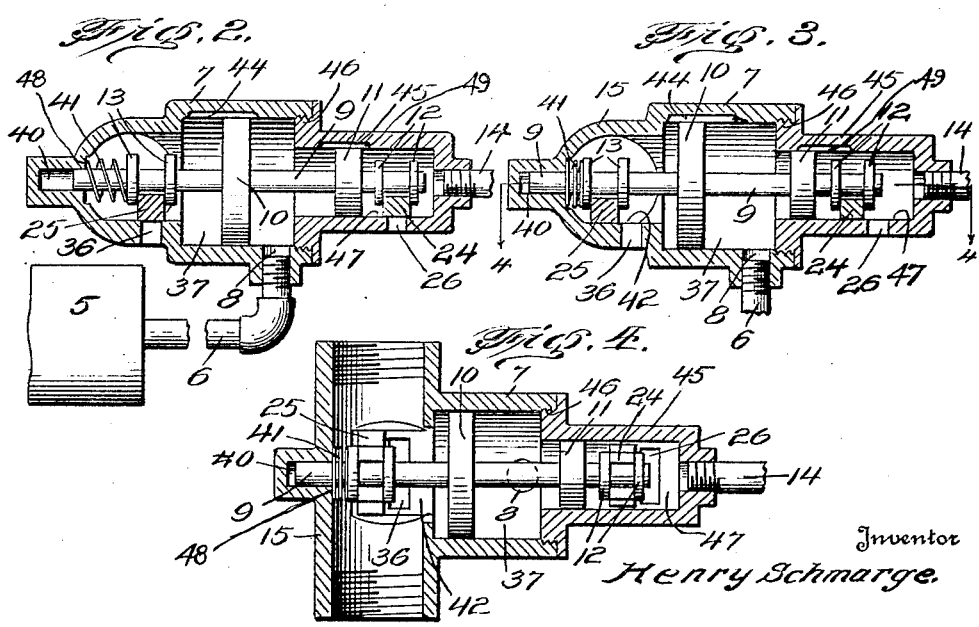
Inventor
Henry Schmarge.
By John B. Brady.
Attorney Patented Dec. 29, 1925.

1,567,394

UNITED STATES PATENT OFFICE.

HENRY SCHMARGE, OF BELEN, NEW MEXICO.

VALVE CONSTRUCTION FOR AIR-BRAKE SYSTEMS.

Application filed May 25, 1925. Serial No. 32,769.

*To all whom it may concern:*

Be it known that I, HENRY SCHMARGE, a citizen of the United States, residing at Belen, in the county of Valencia and State of New Mexico, have invented certain new and useful Improvements in Valve Construction for Air-Brake Systems, of which the following is a specification.

My invention relates broadly to air brake systems, and more particularly to a valve construction for use in air brake systems for securing a quick action pressure release in the air brake system.

My invention has particular application to an air brake system of the kind described in Letters Patent 1,541,663, granted to me June 9, 1925. In the air brake system of the character described in my copending application, I provide means for preventing the operation of the triple valve in the emergency position at undesired periods for eliminating damage or injury to the equipment and loading which often occurs when emergency action of the brakes takes place at times when such action is not intended or desired. I utilize an auxiliary cylinder secured to the triple valve and containing an operating piston having a protruding stem thereon which normally forms an obstruction preventing the movement of the triple valve to emergency position until the piston member moves from its normal position. The piston member is maintained in its normal position by means of air under-pressure which is supplied to the auxiliary cylinder through an auxiliary train pipe and branch pipe from a control position adjacent the usual engineer's valve. By this arrangement the release of air in the auxiliary train pipe results in the release of air in the auxiliary cylinder enabling the triple valve to move to emergency position.

It is the object of the present invention to provide an improved valve construction for securing a quick action release of the pressure in the auxiliary cylinder upon reduction in pressure in the auxiliary train pipe.

I provide a valve construction which may be interposed at any point between the auxiliary train pipe and the auxiliary cylinder on the triple valve for effectively controlling the quick release of pressure in the auxiliary cylinder, enabling the triple valve to move to emergency position without delay. I preferably place the valve construction in the branch pipe and I may position the valve at the point of connection between the auxiliary train pipe and the branch pipe, although I desire that it be understood that the valve construction of my invention may be positioned at any point in the branch pipe.

The valve construction of my invention consists of a pair of adjacent cylinders of relatively different diameters with separate pistons of different sizes arranged to be reciprocated in the cylinders for the longitudinal movement of a central stem on which the pistons are mounted. The central stem carries a slide valve on each end thereof arranged to close or open ports in the separate cylinders leading to atmospheric pressure. The larger cylinder connects with the train pipe so that train pipe pressure is normally effective against the relatively large piston serving to normally maintain the slide valves in such position that the ports are normally closed to atmosphere. In this position the auxiliary cylinder on the triple valve may be charged with the auxiliary train pipe pressure for maintaining the triple valve against action in emergency position. I provide an auxiliary reservoir for effectively applying pressure against the opposite side of the relatively large operating piston such that immediately upon reduction in pressure in the auxiliary train pipe, the pressure derived from the auxiliary reservoir becomes effective to move the operating piston in an opposite direction to that in which the auxiliary train pipe pressure normally tends to urge the said piston. This quick action movement results in the opening of the ports in the set of cylinders, rapidly reducing the pressure in the auxiliary cylinder on the triple valve, and quickly reducing the pressure in the train pipe. I so arrange the auxiliary reservoir that it may be automatically charged from the auxiliary train pipe so that the system may be compactly and efficiently employed on railway trains.

My invention will be more clearly understood from the specification hereinafter following by reference to the accompanying drawings, in which:

Figure 1 is a diagrammatic view showing the relative arrangement of the parts of the air brake system in which the valve construction of my invention is employed;

Fig. 2 is a partial cross-sectional view taken centrally through the valve construction of my invention showing the pistons positioned for charging the auxiliary cylinder on the triple valve; Fig. 3 shows the valve with its pistons in position for quick action release of the pressure in the auxiliary cylinder on the triple valve; and Fig. 4 is a plan view partially in cross-section showing the arrangement of the pistons and slide valves of the valve construction in pressure released position.

The operation of the air brake system with which the valve construction of my present invention is employed will be more fully understood by reference to my copending application. The details of the system are fully set forth in said application and will be only generally referred to herein. Reference character 1 designates the triple valve of the air brake system provided with the usual storage reservoirs 3 and 4. The auxiliary cylinder 2 forming the emergency quick action preventive means, as more fully appears in my copending application, is secured to the triple valve. The main train pipe is designated at 28 and extends through coupling members 30 to the engine cab 22 where the engineer's valve 31 is positioned and connected with the main train pipe to riser 32. The main train pipe 28 extends through the series of cars from car to car to such couplings as represented at 29. A conductor's valve 33 may be located along the train pipe for releasing the brake pressure at other points than the engine cab. The auxiliary pipeline is designated at 16 which parallels the main train pipe 28 and connects through suitable couplings 18 and 19 with an auxiliary valve 21 in the engine cab 22. The auxiliary valve 21 is situated on one end of the riser 20 which connects with the auxiliary pipeline 16. The auxiliary pipeline 16 may extend from car to car by means of suitable flexible coupling pipes which I have indicated at 17 connected to the cutout valve 23. The main train pipe 18 connects the triple valve through the brake pipe 27. The auxiliary cylinder 2 is supplied with air from the auxiliary train pipe 16 through branch pipe 14. At the junction of the branch pipe 14 and the auxiliary train pipe 16 I have illustrated the T-valve 15 which will be described in more detail hereinafter. The T-valve includes a connection to both ends of the auxiliary pipeline 16 and has a relatively large cylindrical chamber 7 and a relatively small cylindrical chamber 45. A connection indicated at 8 is taken from the relatively large cylindrical chamber 7 to the auxiliary reservoir 5 through pipeline 6. The outer end of the relatively large cylindrical chamber 7 is screw threaded at 46 to receive the screw threaded end of the relatively small cylindrical chamber 45. The branch pipe 14 terminates in the head of the relatively small chamber 45. I provide a reciprocating stem 9 which is seated in the end 40 of the T-valve 15 and carries piston members 10 and 11 operating in the relatively large cylindrical chamber 7 and small chamber 45 respectively. The stem 9 carries valve guides 12 and 13 adjacent opposite ends thereof between which are gripped valve members 24 and 25 which cooperate with flat surfaces 47 and 42 in which ports 26 and 36 are formed respectively. The stem 9 has a coil spring 41 disposed thereon between the end wall 48 of the valve 15 on one of the guides 13. The spring 41 normally tends to urge the stem 9 together with pistons 10 and 11 toward the right in the position shown in Fig. 2 where the valve members 24 and 25 normally close the ports 26 and 36 respectively. The auxiliary cylinder 2 is charged with air under pressure from the auxiliary train pipe 16 by leakage through the feed groove 44 in the relatively large cylinder 7 and feed 49 in the relatively small cylinder 45. The air from the auxiliary pipeline 16 also charges the auxiliary reservoir 5 by leakage through feed groove 44 past piston 10 through outlet 8, auxiliary branch pipe 6 and into the storage reservoir 5.

The relatively small piston 11 serves as an obstruction in the relatively small cylindrical chamber 45 and is only large enough to permit the slide valve 24 to operate in the rear thereof. The relatively large piston 10 is the operating piston against which the air pressure in the auxiliary pipeline 16 or the air pressure from the auxiliary storage chamber 5 becomes effective to move the stem 9 to the right or left. When the auxiliary valve 21 in the engine cab is opened and pressure is released in the auxiliary train pipe 16 the pressure in the interior space 37 within the relatively large cylindrical chamber 7 is reduced to the left of the operating piston 10. The pressure stored in the auxiliary storage reservoir 5 now becomes effective against the right hand surface of the auxiliary piston 10 to force the stem 9 in a left hand direction against the action of spring 41 which causes slide valves 24 and 25 to uncover the ports 26 and 36, releasing the air from the auxiliary train pipe 16, the auxiliary cylinder 2, and the branch pipe 14. This operation permits the piston in the auxiliary cylinder 2 to retreat to such position as to remove the obstruction carried thereby, enabling the triple valve to function in emergency position. By reason of the double release which I provide the action becomes extremely quick, thereby removing all obstruction against the triple valve moving immediately to the emergency position under control of the engineer's valve 31. The function of the spring 41 is to return the valve stem 9 to normal or lap position whereby the slide valves 24 and 25 again close the ports 26 and 36 preparatory to recharging the auxiliary storage reservoir 5 and the auxiliary cylinder 2. I construct the valve parts of extremely light material and avoid all friction possible so that the spring 41 may be very light in its operation.

I desire that it be understood that the location of the T-valve structure is not limited to the T connection illustrated, but that it may be placed anywhere in the branch pipe 14 to enable a cutout cock to be placed between the valve and the train pipe for better control of the system. It will be observed that I provide means for securing a positive quick action for reducing the air pressure in the branch pipe and in the emergency control auxiliary cylinder 2 so that all lag or delay in the operation of the triple valve is avoided.

While I have described the valve construction in a certain particular embodiment I desire that it be understood that modifications may be made in the valve structure and the principles of my invention embodied in other arrangements without departing from the scope of the invention as defined in the appended claims.

What I claim and desire to secure by Letters Patent of the United States is as follows:—

1. In an air brake system the combination of a triple valve, a train pipe connected with said triple valve, an auxiliary train pipe, an auxiliary cylinder connected with said triple valve and having means for preventing movement of said valve to emergency position at undesired periods, means for reducing the pressure in said auxiliary train pipe, and means responsive to the reduction in pressure in said auxiliary train pipe for rapidly reducing the pressure in said auxiliary cylinder for enabling said triple valve to move to emergency position at desired periods.

2. In an air brake system, the combination of a triple valve, a train pipe for supplying air under pressure to said triple valve, an auxiliary cylinder secured to said triple valve and having means therein for preventing movement of said valve to emergency position at undesired periods, an auxiliary train pipe connected with said auxiliary cylinder, means for reducing the pressure in said auxiliary train pipe, and quick action means responsive to said reduction in pressure for immediately reducing the pressure in said auxiliary cylinder for enabling said triple valve to move to emergency position at desired periods.

3. In an air brake system, the combination of a triple valve, a train pipe for supplying air under pressure to said triple valve, an auxiliary cylinder secured to said triple valve, and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a pair of cylinders of relatively different diameters, a pair of pistons slidable in said cylinders, a central stem inter-connecting said pistons, valves actuated by said stem and arranged to close or open ports to the atmosphere, said pistons being arranged to respond to the reduction in pressure in said auxiliary train pipe to move said valves to open position for reducing pressure in said auxiliary cylinder, whereby said triple valve may be free to move to emergency position at desired periods.

4. In an air brake system, the combination of a triple valve, a train pipe for supplying air under pressure to said triple valve, an auxiliary cylinder secured to said triple valve and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a relatively large cylindrical chamber connected with said auxiliary train pipe, a relatively small cylindrical chamber adjacent said relatively large cylindrical chamber and connected with said auxiliary cylinder, a pair of piston members slidably mounted in said chambers, a central stem arranged to be longitudinally controlled upon movement of said piston members, valves carried by opposite ends of said stem, each of said valves being arranged to open or close ports connected with said cylindrical chambers for enabling said auxiliary cylinder to be charged with air from said auxiliary train pipe or for enabling the pressure in said auxiliary cylinder to be rapidly reduced.

5. In an air brake system, the combination of a triple valve, a train pipe for supplying air under pressure to said triple valve, an auxiliary cylinder secured to said triple valve, and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a pair of axially aligned cylinders, one of said cylinders having a diameter larger than the other of said cylinders, a pair of piston members slidably mounted in said cylinders, a central stem carrying said piston members, a pair of slide valves actuated by opposite ends of said stem for closing or opening ports in said cylinders for charging the said auxiliary cylinder with air from said auxiliary train pipe and rapidly reducing the pressure in said auxiliary train pipe and said auxiliary cylinder.

6. In an air brake system, the combination of a triple valve, a train pipe for supplying air under pressure to said triple valve, an auxiliary cylinder secured to said triple valve, and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a cylindrical chamber, a piston member slidably mounted in said chamber, a stem carrying said piston member and arranged to actuate a valve device for opening and closing a port in said cylindrical chamber, whereby pressure from said auxiliary train pipe normally acts against one side of said piston member for moving said valve device to a position closing said port and means responsive to reduction in pressure in said auxiliary train pipe for effectively urging said piston member in an opposite direction for moving said valve device to open position for rapidly reducing pressure in said auxiliary train pipe.

7. In an air brake system, the combination of a triple valve, a train pipe for supplying air under pressure to said triple valve, an auxiliary cylinder secured to said triple valve, and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a pair of cylindrical chambers, a central movable stem therein, a pair of piston members located on said stem, slide valves arranged to be actuated within said cylindrical chambers for opening or closing ports to atmosphere in said cylindrical chambers, means connected with one of said cylindrical chambers for supplying air under pressure thereto arranged to become effective upon reduction in pressure in said auxiliary train pipe for moving said slide valves to open position, whereby pressure in said auxiliary cylinder is rapidly reduced.

8. In an air brake system, the combination of a triple valve, a train pipe for supplying air under pressure to said triple valve, an auxiliary cylinder secured to said triple valve, and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a pair of cylinders, one having a relatively large diameter and the other having a relatively small diameter, a connection from one end of said relatively large cylinder to said auxiliary train pipe and a connection from one end of said relatively small cylinder to said auxiliary cylinder, a pair of piston members slidable in said cylinder, a stem carrying said piston members, valves controlled by the movement of said stem, means for supplying air under pressure to both sides of the piston in said relatively large cylinder whereby upon reduction in pressure in said auxiliary train pipe, said means become effective to move the piston in the relatively large cylinder for opening said valves for rapidly reducing pressure in said auxiliary cylinder.

9. In an air brake system, the combination of a triple valve, a train pipe for supplying air under pressure to said triple valve, an auxiliary cylinder secured to said triple valve, and having means therein for preventing movement of said valve to emergency position at undesired periods, an auxiliary train pipe connected with said auxiliary cylinder, means for reducing the pressure in said auxiliary train pipe, and quick action means interposed between said auxiliary train pipe and said auxiliary cylinder, said quick action means comprising a cylindrical member, a longitudinally movable stem within said member, a piston carried on said stem, a valve actuated by the movement of said stem for opening and closing a port to atmosphere, means for normally balancing said piston in a position in which said valve closes said port, said means becoming unbalanced upon reduction in pressure in said auxiliary train pipe for moving said stem to a position where said valve opens the port for rapidly reducing pressure in said auxiliary cylinder.

In testimony whereof I affix my signature.

HENRY SCHMARGE.